United States Patent
Choi et al.

(10) Patent No.: US 6,241,932 B1
(45) Date of Patent: Jun. 5, 2001

(54) METHOD AND SYSTEM FOR REDUCING POLYMER DEGRADATION PRODUCTS IN TWO STAGE INJECTION MOLDING MACHINES

(75) Inventors: Christopher W. M. Choi, Richmond Hill; Richard M. Unterlander, Holland Landing, both of (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 09/267,342

(22) Filed: Mar. 15, 1999

Related U.S. Application Data

(60) Provisional application No. 60/078,587, filed on Mar. 19, 1998.

(51) Int. Cl.[7] .................................................. B29C 45/54
(52) U.S. Cl. .............................. 264/328.8; 264/328.19; 425/558; 425/562
(58) Field of Search ............................... 264/40.1, 328.1, 264/328.8, 328.19; 425/145, 207, 562, 557–561; 366/77, 78, 133

(56) References Cited

U.S. PATENT DOCUMENTS

| | | |
|---|---|---|
| 3,117,348 | 1/1964 | Rees et al. . |
| 4,290,701 | * 9/1981 | Schad ..................................... 366/77 |
| 4,460,324 | 7/1984 | Van Appledorn . |
| 4,717,324 | 1/1988 | Schad et al. . |
| 4,966,545 | 10/1990 | Brown et al. . |
| 5,281,384 | 1/1994 | Banks . |

* cited by examiner

Primary Examiner—Jill L. Heitbrink
(74) Attorney, Agent, or Firm—Gowling Lafleur Henderson LLP

(57) ABSTRACT

A method and system of operating a two stage injection molding machine wherein movement of the injection plunger in the shooting pot is coordinated with movement of the plasticizing screw and melt flow into the shooting pot such that the plunger provides minimal resistance to the melt flow into the shooting pot while avoiding the production of voids or air inside the melt. The undesired shear forces to which the melt is exposed are thus reduced, correspondingly reducing the melt degradation products which would otherwise result.

3 Claims, 2 Drawing Sheets

METHOD AND SYSTEM FOR REDUCING POLYMER DEGRADATION PRODUCTS IN TWO STAGE INJECTION MOLDING MACHINES

This application claims the benefit of U.S. Provisional No. 60/078,587 filed Mar. 19, 1998.

FIELD OF THE INVENTION

The present invention relates to an improved method and system for injection molding in two stage or pre-plasticizing injection molding machines. In particular, the invention can be used in molding preforms and other articles with lower acetaldehyde content than articles produced with conventional techniques.

BACKGROUND OF THE INVENTION

Beverage containers and the like are commonly made by blow molding a parison, or preform, that is made from polyethylene teraphthalate (PET) material. Such PET reheat and blow preforms are commonly manufactured by injection molding equipment with either a reciprocating screw or with a two stage injection unit.

The reciprocating screw type is simpler in concept and less expensive to build, and hence is more widely used. In this system, a supply of particulate thermoplastic polymer is maintained in a hopper which feeds the inlet end of a plasticizing screw encased in a heated barrel of constant diameter. Helical flights on the screw convey the particles along the screw where the mass of particles are compressed and rub against the heated barrel surface. This action provides frictional heating as well as some heat conducted from the barrel. However, the bulk of the energy imparted by the screw to the particles is the result of shear. The particles are sheared between two surfaces, the root diameter of the screw and the inner diameter of barrel, which move with respect to each other. The heat generated by this shearing action increases along the length of the barrel as the screw root increases in diameter closer to the outlet end of the screw, so that a homogeneous melted mass of the polymer material is produced.

When the desired amount of polymer accumulates in the space beyond the discharge end of the screw, the screw stops its rotation. It then serves as a plunger, moving forward and forcing a desired quantity of the polymer melt, or a "shot", into a mold or molds with one or more cavities. The polymer melt cools in these cavities and the finished molded articles are ejected from the mold or molds.

The two stage or pre-plasticizing injection system is similar to the reciprocating screw system. However, in this two stage injection system, the role of the plasticizing or extruder screw is restricted to melting the material, with the injection of the molten plastic into the injection mold accomplished by a separate shooting pot and injection plunger or piston system.

The use of a two stage injection system was pioneered by Rees in U.S. Pat. No. 3,117,348. Brown et al., in U.S. Pat. No. 4,966,545, describes a method and apparatus for using a single shooting pot to sequentially deliver two metered injections of the same resin in the same mold cavity. U.S. Pat. No. 4,460,324 to Van Appledorn, describes a method of controlling the injection speed of the plunger in the shooting pot, thereby controlling the injection rate of plastic material into the mold.

For multi-layered applications, U.S. Pat. No. 4,717,324 by Schad, assigned to the assignee of the present invention, describes the application of multiple shooting pots, one for each different resin feeding into each cavity of a multi-cavity mold.

The separation of functions in a two stage injection machine allows an additional degree of freedom to optimize each of the processes in a relatively independent manner. High speed transfer of the melt usually exposes the melt to high shear rates due to resistance to the flow of the melt. Excessive shear rates, and their related heating effect on the melt contribute to the formation of degradation products. The predominant degradation product generated during standard processing of PET is acetaldehyde. Its presence in molded objects such as beverage bottles, water bottles and food containers and the like is very deleterious from a taste standpoint, even at very low concentration levels. Consequently, the major focus of optimization in the plasticizing screw is the reduction of polymer degradation while maintaining melt output.

Separating the plasticization function from the injection function allows the plasticization screw to run in a nearly continuous manner, with the screw only stopping momentarily just prior to melt transfer from the plasticization unit to the injection unit. This mode of operation allows reduced rotational speeds to be employed, as disclosed by Banks in U.S. Pat. No. 5,281,384, and therefore reduces degradation of the molten polymer by reducing the amount of shear heat generated during plasticization. Also, because the screw is operating in a nearly continuous mode, the amount of degradation that occurs is also reduced because the diameter of the screw can be reduced when compared to a standard reciprocating screw injection unit. This size reduction shortens the total melt residence time, or the length of time the material is in a molten state, and hence reduces the degradation products which result from undue heating.

In general, conventional two stage injection systems produce preforms and other articles with acceptable levels of acetaldehyde or other degradation products. Other factors, such as the operating temperature, screw speed, back pressure, melt transfer pressure and melt transfer speed, as well as the particular resin material and the size of the shot can all be important factors in determining the final level of acetaldehyde in the melt When all of these factors are combined, the prior art methods were found to meet specifications, but always at the upper end of the acceptable range of acetaldehyde or other degradation products, making the process much harder to control. Thus, a need exists for a solution to reduce the acetaldehyde and/or other degradation content of the finished product.

SUMMARY OF THE INVENTION

It is an object of the present invention to provide a novel method and system to reduce polymer degradation products which obviates or mitigates the disadvantages of the prior art.

In particular, the present invention reduces the acetaldehyde content of finished products by improving the plasticization and transfer function of an injection molding machine.

According to a first aspect of the present invention, there is provided a method of operating a two-stage injection molding machine communicating with a mold, the machine including a plasticizing screw to produce melt material, a shooting pot with an injection plunger, and a distributor valve interposed between said shooting pot, said plasticizing screw and said mold, said distributor valve operable to alternately place said shooting pot into fluid communication with said plasticizer and said mold, said method comprising the steps of:

(a) injecting a previously plasticized amount of melt material from said shooting pot into said mold through said distributor valve;

(b) waiting during a hold period for the previously injected shot to cool within said mold and injecting additional material to pack said mold to compensate for thermal shrinkage;

(c) waiting during a cooling period for said shot to cool;

(d) when said shot is cooled, opening said mold and ejecting the resulting finished part from said mold;

(e) closing said mold and making said mold ready for another injection operation;

(f) simultaneously with steps (a) through (e):
  (i) plasticizing an amount of melt material in said plasticizer;
  (ii) transferring said amount of melt material to said shooting pot through said distributor valve by co-ordinating the rotational and axial movement of the plasticizing screw with the axial movement of the injection plunger such that the volume of said shooting pot is substantially the same as the volume of melt received therein; and (g) repeating steps (a) through (f) for each injection cycle.

According to another aspect of the present invention, there is provided a method of plasticizing material and transferring the resulting melt material to a shooting pot in a two stage injection molding machine, comprising the steps of:

(i) rotating a plasticizing screw at a selected speed to produce a desired amount of said melt material within a selected time;

(ii) determining when a predefined amount of melt material has been accumulated in said plasticizing screw, providing fluid communication between said plasticizing screw and a shooting pot in said machine and moving said screw axially, while maintaining said rotation, to transfer said melt material from said screw into said shooting pot;

(iii) increasing the volume of said shooting pot as said melt material enters therein such that said shooting pot volume is substantially equal to the volume of melt material received; and (iv) providing fluid communication between said shooting pot and an injection nozzle and expressing said melt material from said shooting pot through said nozzle and simultaneously re-performing steps (i) through (iii).

According to yet another aspect of the present invention, there is provided a system for plasticizing material and transferring the resulting melt material to a shooting pot in a two stage injection molding machine, comprising:

a plasticizing screw and barrel to receive particulate material;

a rotation drive means to rotate said screw within said barrel such that said screw accepts particles of said material and melts and compresses said material within said barrel;

an axial drive to move said screw axially within said barrel to express melt therefrom;

a shooting pot to receive melt from said barrel;

an injection plunger to express melt from said shooting pot;

a distributor valve to place said shooting pot into fluid communication with alternate ones of said barrel and an injection nozzle; and a control means operable to control the rotation speed of said screw, said axial drive means, said distributor valve and said injection plunger such that, when a preselected amount of melt is accumulated in said barrel, said accumulated melt is expressed from said barrel into said shooting pot and said injection plunger is moved to maintain the volume of said shooting pot substantially equal to the volume of melt received in said shooting pot and further operable that, when a predetermined amount of melt is received in said shooting pot, said injection plunger is operated to express said melt from said shooting pot through an injection nozzle to a mold.

BRIEF DESCRIPTION OF THE DRAWINGS

Embodiments of the present invention will now be described, by way of example only, with reference to the attached Figures, wherein.

DETAILED DESCRIPTION

Figure 1:
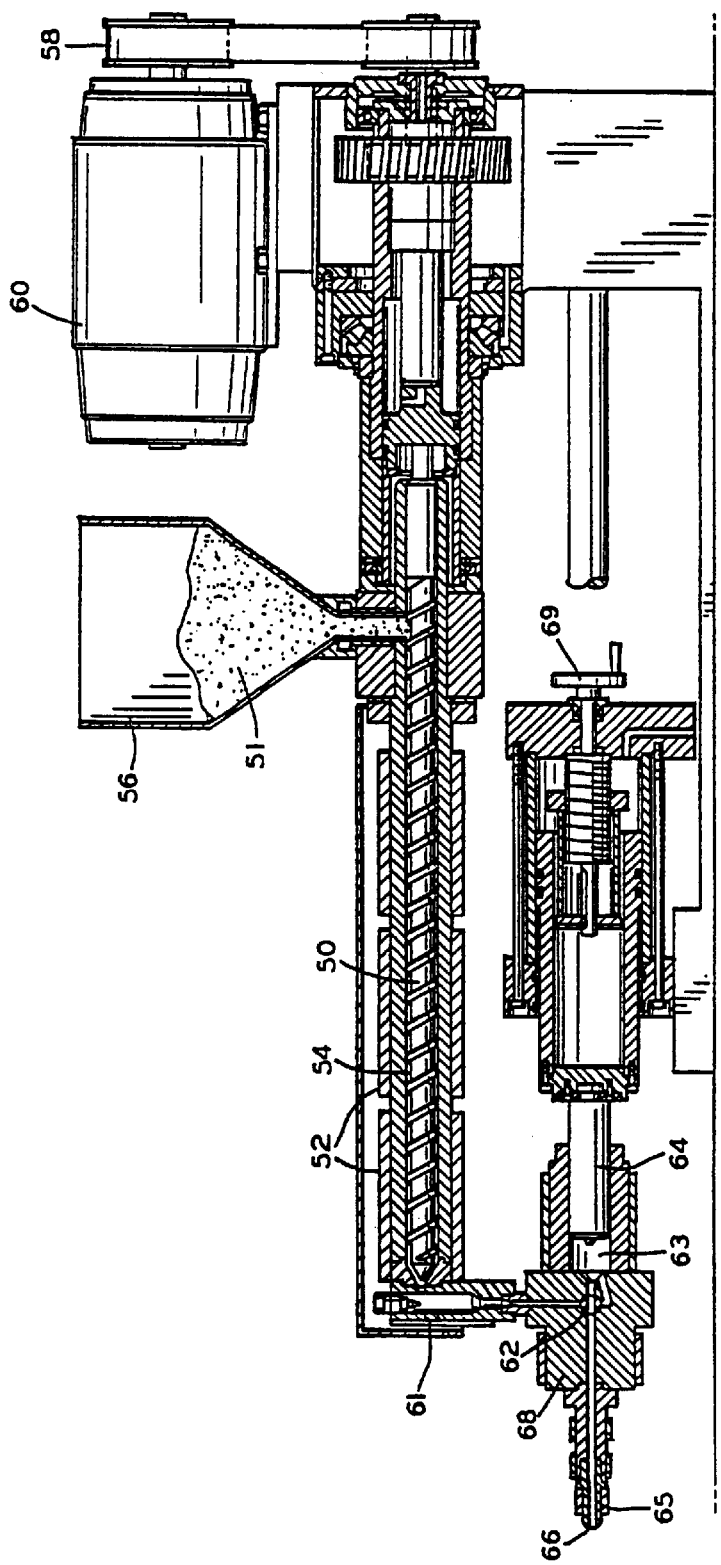
FIG. 1 is a side view, partially in section, of the plasticizing and injection portion of a conventional two stage injection molding machine.

Referring now to FIG. 1, an injection-molding machine of the general two stage type comprises a substantially fixed platen and a movable platen (not shown), a stationary barrel 54, surrounded by several heater bands 52 which are divided into control zones to assist in plasticization of the melt and to maintain the melt at the desired temperature. Inside barrel 54, a screw 50 is rotatable, to provide shear heating of the melt, and is axially reciprocal. Rotation is imparted to the screw 50 by a motor 60 and a belt drive 58 or other suitable means. Granular plastic material 51 introduced into barrel 54 from a hopper 56 is advanced by rotating screw 50 toward a barrel head 61 at the front end of barrel 54. In an embodiment of the present invention, the plastic material consists of polyethylene teraphthalate, or PET.

Barrel head 61 in turn communicates with a distributor 68 via a distributor or melt valve 62. Distributor valve 62 is rotatable between an open position, in which passageways provided in the distributor 68 and the valve 62 provide fluid communication between barrel head 61 and a shooting pot 63, and a closed position, wherein shooting pot 63 is in fluid communication with a nozzle 65 whose injection orifice 66 is blocked when the mold is open.

The volume of the melt accumulated before injection into the mold is controlled by an injection plunger 64 which closes one end of shooting pot 63. In conventional injection molding machines, the maximum volume of shooting pot 63 is adjusted by a shot size adjustment means 69 which establishes a limit beyond which plunger 64 cannot be moved. In the present invention, injection plunger 64 is moved by an injection piston (not shown) via hydraulic, electric or other means (also not shown), and the maximum volume of shooting pot 63 is controlled by the movement of this injection piston.

As is known, suitable control means are provided by the manufacturer of the molding machine to continuously rotate the extruder or plasticizing screw 50 to plasticize a quantity of the material held in the hopper 56. Since the distributor valve 62 will be closed in relationship to the barrel 54 during the non-transfer portion of the process, plasticized material will first accumulate in the barrel head 61 and then will accumulate in the forward portion of the barrel 54, thereby forcing the plasticizing screw 50 rearwardly away from the barrel head until it reaches a preset position, at which point rotation normally stops.

At this point, shooting pot 63 is ready to receive plasticized material from the barrel and distributor valve 62 is opened by the control means and, substantially simultaneously, plasticizing screw 50 is rotated and advanced toward the barrel head. At this point, the plasticized material begins to transfer from the forward end of barrel 54 and barrel head 61 to shooting pot 63.

As mentioned above, several factors contribute to the production of undesired degradation products such as acetaldehyde in the melt. As mentioned, residence time of the melt within the injection machine, i.e.—the total time the melt is heated and the shearing of the melt material, and its associated heating of the melt are the predominate factors. The present inventors have found that by better controlling the transfer process, the production of degradation products can be reduced. Specifically, the careful control of the rotational and axial speed of screw 50 and the control of injection plunger 64 such that it is pulled back by the injection piston (to proactively maintain the volume of shooting pot 63 substantially the same as the volume of incoming melt, rather than pushing plunger 64 back with the pressure of the melt entering shooting pot 63). This results in the melt being subjected to an amount of shear which is less than that melt in prior art systems is subjected to.

The first step to obtain better control of the transfer process is to determine the maximum allowable transfer time of the melt from the plasticizing screw 50 through the barrel head 61 and into shooting pot 63. This time is measured from at least one previous continuous machine cycle and is based on the elapsed time between the start of transfer and the start of injection. This transfer time is assigned a target value $T_t$. The rotational speed of screw 50 required to produce the desired volume of melt to fill the shot volume within the target transfer time is designated as $N^{rotational}_{screw}$, and is calculated in the following manner.

Specifically, the volume required for a particular shot size, $V_{ss}$, is equal to the sum of the volume produced before the start of transfer, $V_{pre}$ and the product of the aforementioned transfer time $T_t$, a constant K, which is a function of the cross-sectional areas of the barrel 54 and barrel head 61, and the rotational speed of the screw, $N^{rotational}_{screw}$, as shown below.

$$V_{ss} = V_{pre} + N^{rotational}_{screw} \times K \times T_t$$

Therefore, the rotational speed of the screw can be expressed as $$N^{rotational}_{screw} = \frac{V_{ss} - V_{pre}}{K \times T_t} = \frac{V_{ss} - V_{pre}}{K} \times \frac{1}{T_t}$$

which represents the target speed that the screw 50 must rotate to provide the additional volume of melt that is required within the allocated transfer time. The screw's actual speed is continuously adjusted by the machine controller (not shown) to this target value.

As melt material accumulates in the forward portion of the barrel 54, screw 50 is normally pushed backwards, away from the barrel head 61. Once shooting pot 63 is ready to receive melt, screw 50 moves axially forward to transfer the melt from the barrel 54 and barrel head 61 through the distributor valve 62 to shooting pot 63.

For optimum productivity, screw 50 also continues its rotation during melt transfer. The target transfer speed of the melt is equivalent to the melt length in front of the screw 50 divided by the aforementioned transfer time $T_t$. This general relationship accounts for the additional melt volume produced by the rotation of the screw 50 as it moves forward. The actual transfer speed is adjusted, by the machine controller, to match the target value on a continuous basis by measuring and adjusting the melt length by any suitable means as will occur to those of skill in the art.

The axial speed of injection plunger 64, $N^{axial}_{plunger}$ as it moves backwards to accommodate the incoming melt from the screw 50 is calculated based on the required shot size volume, $V_{ss}$ and the transfer time $T_t$. Since the required shot volume (which is known for a given mold and machine) can be expressed as the product of the aforementioned transfer time $T_t$, the cross-sectional area of the shooting pot, and the axial speed of the plunger, the following relationship can be derived:

$$V_{ss} = A_{sp} \times N^{axial}_{plunger} \times T_t$$

so that the axial speed of the injection plunger, $N^{axial}_{plunger}$, can be expressed explicitly as:

$$N^{axial}_{plunger} = \frac{V_{ss}}{A_{sp} \times T_t}$$

The plunger profile generated in this manner co-ordinates the forward movement of the melt via screw 50 with the rearward movement of plunger 64 to allow filling of shooting pot 63 without generating significant resistance to melt flow. This co-ordination reduces the shear and heat normally generated during transfer of the melt, and hence reduces the likelihood of degradation products such as acetaldehyde being produced.

Figure 2:
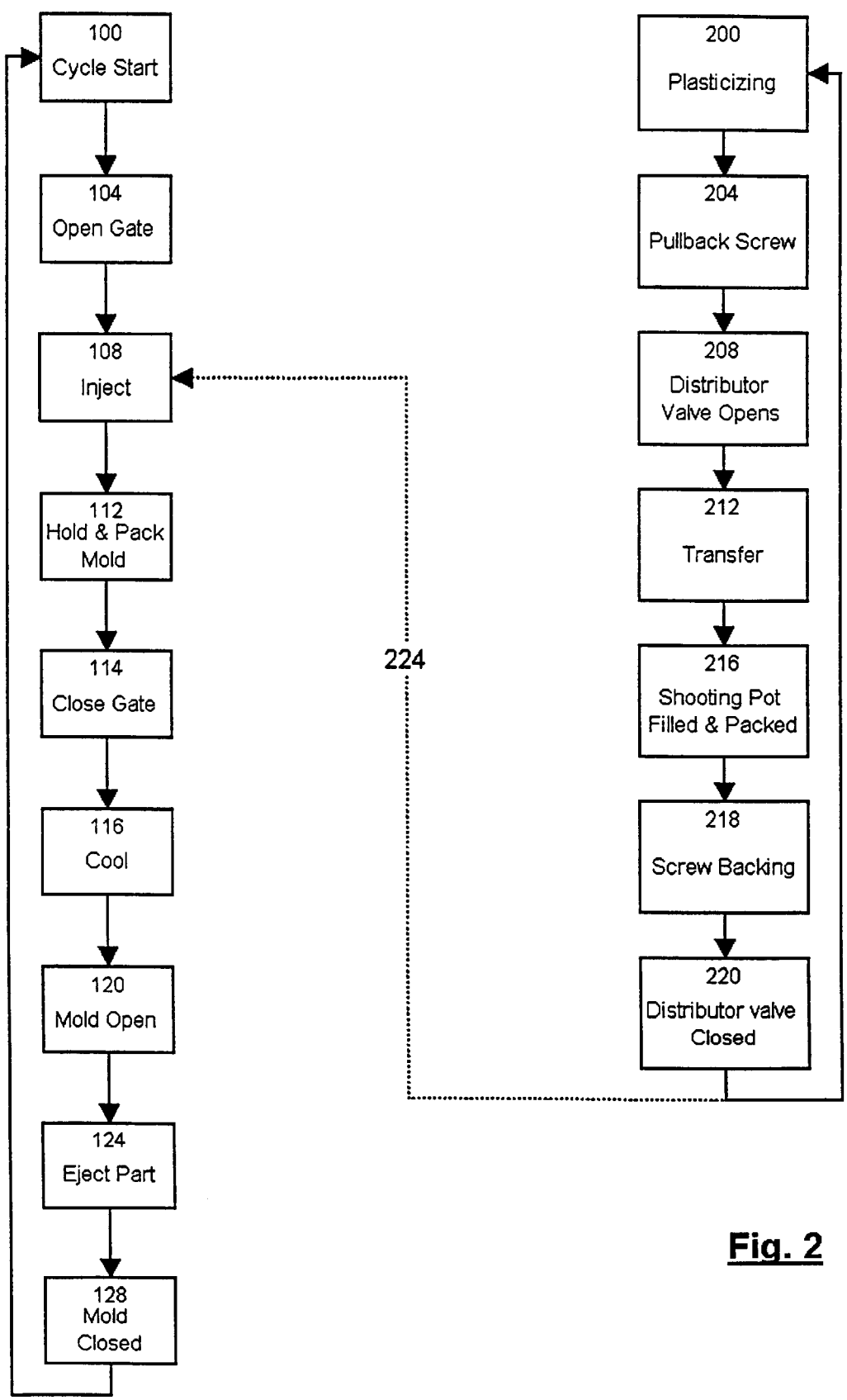
FIG. 2 is a flow chart showing the steps present in a method of operating a two stage injection molding machine in accordance with the present invention.

A description of the steps of said method in relationship to the steps present in the standard two stage injection molding machine is made with reference to FIG. 2. The method commences, at step 100, with the injection cycle being started, by any suitable means known to those of skill in the art such as a conventional machine controller. Next at step 104, the valve or thermal gates are opened and, with the gates open, a previously plasticized shot is injected into the mold cavity or cavities at step 108. At step 112, a Hold & Pack period begins wherein the mold is subject to holding pressure and additional material is injected to compensate for thermal shrinkage as the material within the mold cools. When the Hold and Pack period expires, and the mold is sufficiently filled, the gate is closed at step 114. A mold cooling period then commences at step 116 while the melt is cooled within the mold cavity to complete formation of the part. At step 120 the mold is opened and at step 124, a finished part is ejected from the mold, either to be removed by a part extractor device or by gravity and, once the part is clear of the mold area, the mold is re-closed at step 128 and the cycle recommences at step 100.

As will be apparent to those of skill in the art, while the injection operation cycle described in steps 100 through 128 is proceeding, a plasticizing and transfer cycle is being performed simultaneously. Specifically, at step 200 the plasticizing operation commences with screw 50 being rotated at a determined speed. As melt material is accumulated in barrel head 61 and in front of screw 50, screw 50 moves along barrel 54 away from barrel head 61. This movement of screw 50 can be explicitly performed by a suitable actuator, as indicated at step 204, to decompress melt being accumulated within the plasticizer unit to reduce the amount of shear the accumulated melt is exposed to and to reduce drool from injection nozzles, etc. on the injection molding machine. Alternatively, screw 50 can be moved along barrel 54 by back pressure exerted by the accumulated melt on screw 50.

When screw 50 reaches a determined distance from barrel head 61, i.e.—when a determined volume of melt has been accumulated, distributor valve 62 opens at step 208 and the transfer of the melt is performed at step 212. Specifically, while screw 50 is advanced toward barrel head 61, a control means ensures that injection plunger 64 is pulled back in shooting pot 63 by the injection piston such that the volume of shooting pot 63 is maintained substantially equal to the total volume of the melt in shooting pot 63. Consequently, the melt enters shooting pot 63 under lower pressure than would be required to have the melt push plunger 64 back, and the melt is thus exposed to reduced amounts of shear. By maintaining the volume of the shooting pot substantially the same as the volume of melt material received therein, voids and air bubbles in the accumulated melt are reduced or eliminated.

At step 216, screw 50 is moved toward barrel head 61 to push the accumulated melt into shooting pot 63 and the control means determines that the desired volume of shot is within shooting pot 63 and packs the shooting pot by adding some additional material after thermal shrinkage has occurred within shooting pot 63. At step 218, screw 50 is backed away from the barrel head 61 to align the feed portion of screw 50 with the hopper from which the particles to be plasticized are introduced.

Distributor valve 62 is closed to screw 50 and opened to the injection nozzle of the injection molding machine at step 220. The shot of molten melt in shooting pot 63 is then injected into the mold at step 108 of the injection operation, as indicated by arrow 224. Once distributor valve 62 is closed at step 220, the plasticizing and transfer process recommences at step 200. Accordingly, as will be apparent to those of skill in the art, while the injection of the previous shot takes place (step 108), and the hold and pack (step 112) and cooling step (116) are performed, plasticizing of the next shot to be transferred to shooting pot 63 is being performed.

In the prior art methods, where the position of injection plunger 64 is not controlled and the incoming melt that is transferred from the plasticizing screw 50 is employed to rapidly push the injection plunger backwards away from distributor valve 62, the melt is subject to high levels of shear, and shear heating, as it enters shooting pot 63 and degradation products, such as acetaldehyde, are produced.

In the method of the present invention, determination of the relevant variables, namely the aforementioned plasticizing screw speed and position, melt transfer speed, etc., is performed by commonly available sensors. Preferably, the control means, which can be any suitable controller such as a commonly available microcontroller or other suitable means as will occur to those of skill in the art, operates on a continuous, adaptive basis wherein the operating parameters of each plasticizing cycle are adjusted in view of the previous operating cycle and sensor measurements obtained in real time. For example, the speed of rotation and the speed of the axial movement of screw 50 can be adjusted from cycle to cycle as process variations occur. Further, as will be apparent to those of skill in the art, some of the cycle parameters which it is desired to monitor either cannot be directly measured and must be inferred, or cannot be measured in real time and must be estimated from the results of a previous cycle.

While the above-described embodiment of the present invention can provide reasonable reductions in the production of degradation products, it is contemplated that in some circumstances a more complete control of the process will be desired. In such a case, the controller means will receive inputs of all or most of the relevant process variables to determine melt transfer control (speed and pressure), injection plunger pullback control (speed, pressure) and plasticizing screw speed control.

The process variables of the plasticizing unit which can be relevant include:

temperatures of the plasticizer's heating zones; back pressure during plasticization;

transfer speed during the transfer of the melt to the shooting pot; transfer pressure during the transfer of the melt to the shooting pot; and the position of the screw.

The process variables of the shooting pot which can be considered include:

temperatures of the shooting pot's heating zones; back pressure of the injection cylinder;

pullback speed of the shooting pot during the transfer of the melt; and the position of the injection plunger.

The process variables of the melt include: temperatures of the melt; internal pressure of the melt; and the flow rate of the melt.

Appropriate measurement devices/sensors are installed to measure the process variables of the machine such as temperatures, forces/pressures, speeds and positions. This measured information is supplied to the control means, such as a general purpose digital controller, which executes pre-programmed software to produce the control objectives by regulating the control elements of the various actuators, heaters, etc.

Measurements of the melt's variables such as its temperatures, pressures and flow rates are either obtained by special transducers or estimated by an appropriate inference method. For example, the inference method can employ a model of the process to compute quantities which either are not or cannot be measured directly, but which are required as inputs to the control means for controlling the process.

Errors in such models can be overcome by means of two complementary control methods, namely:

the use of feedback to drive model states towards process states despite modeling error; and the use of system identification to adapt the model toward the process, to reduce modeling error, i.e.—continual adaptive refinement of the model.

The present invention provides a novel system and method for controlling the production and transfer of melt in a two stage injection molding machine to reduce the production of undesired melt degradation products, such as acetaldehyde. Careful control of the rotation and axial speeds of the plasticizer screw and the shooting pot injection plunger are employed to reduce undesired shear on the melt.

We claim:

1. A method of operating a two-stage injection molding machine communicating with a mold, the machine including a plasticizing screw to produce melt material, a shooting pot with an injection plunger, and a distributor valve interposed between said shooting pot, said plasticizing screw and said mold, said distributor valve operable to alternately place said shooting pot into fluid communication with said plasticizer and said mold, said method comprising the steps of:

(a) injecting a previously plasticized amount of melt material from said shooting pot into said mold through said distributor valve;

(b) waiting during a hold period for the previously injected shot to cool within said mold and injecting additional material to pack said mold to compensate for thermal shrinkage;

(c) waiting during a cooling period for said shot to cool;

(d) when said shot is cooled, opening said mold and ejecting the resulting finished part from said mold;

(e) closing said mold and making said mold ready for another injection operation;

(f) simultaneously with steps (a) through (e):
   (i) plasticizing an amount of melt material in said plasticizer;
   (ii) transferring said amount of melt material to said shooting pot through said distributor valve by co-ordinating the rotational and axial movement of the plasticizing screw with pulling back the injection plunger with the injection piston to proactively maintain the volume of said shooting pot substantially the same as the volume of melt received therein; and (g) repeating steps (a) through (f) for each injection cycle.

2. A method of plasticizing material and transferring the resulting melt material to a shooting pot in a two stage injection molding machine, comprising the steps of:

(i) rotating a plasticizing screw at a selected speed to produce a desired amount of said melt material within a selected time;

(ii) determining when a predefined amount of melt material has been accumulated in said plasticizing screw, providing fluid communication between said plasticizing screw and a shooting pot in said machine and moving said screw axially, while maintaining said rotation, to transfer said melt material from said screw into said shooting pot;

(iii) proactively increasing the volume of said shooting pot by pulling back the injection plunger as said melt material enters therein such that said shooting pot volume is substantially equal to the volume of melt material received; and (iv) providing fluid communication between said shooting pot and an injection nozzle and expressing said melt material from said shooting pot through said nozzle and simultaneously re-performing steps (i) through (iii).

3. A system for plasticizing material and transferring the resulting melt material to a shooting pot in a two stage injection molding machine, comprising:

a plasticizing screw and barrel to receive particulate material;

a rotation drive means to rotate said screw within said barrel such that said screw accepts particles of said material and melts and compresses said material within said barrel;

an axial drive to move said screw axially within said barrel to express melt therefrom;

a shooting pot to receive melt from said barrel;

an injection plunger to express melt from said shooting pot;

a distributor valve to place said shooting pot into fluid communication with alternate ones of said barrel and an injection nozzle; and a control means operable to control the rotation speed of said screw, said axial drive means, said distributor valve and said injection plunger such that, when a preselected amount of melt is accumulated in said barrel, said accumulated melt is expressed from said barrel into said shooting pot and said injection plunger is proactively moved by said injection plunger to maintain the volume of said shooting pot substantially equal to the volume of melt received in said shooting pot and further operable that, when a predetermined amount of melt is received in said shooting pot, said injection plunger is operated to express said melt from said shooting pot through an injection nozzle to a mold.

\* \* \* \* \*